Figure 1:
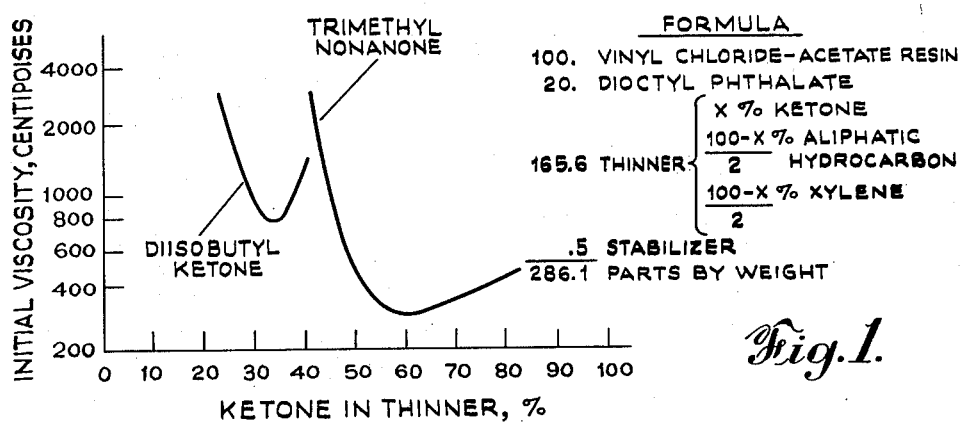

Patented Jan. 15, 1952

2,582,354

UNITED STATES PATENT OFFICE 2,582,354

DISPERSIONS OF VINYL CHLORIDE RESINS

George M. Powell, 3rd, South Charleston, and Theodore E. Mullen, Charleston, W. Va., assignors, by mesne assignments, to Union Carbide and Carbon Corporation, a corporation of New York Application October 20, 1948, Serial No. 55,458

6 Claims. (Cl. 260—32.8)

Dispersions of vinyl chloride resins suspended, not dissolved, in organic liquids have recently been introduced. When the organic liquids are volatile, the dispersions are termed organosols; and when the organic liquids are non-volatile, the dispersions are called plastisols.

Films are deposited from both types of dispersions by heating, whereupon the resin particles are fused to form continuous films in both instances and the volatile organic liquids, when present, are evaporated. In the formulation of organosols, mixtures of ketones and hydrocarbons frequently comprise the volatile organic liquids; the ketone serving as a dispersant partially to swell and solvate the dispersed resin particles and the hydrocarbon serving as a diluent. It has been observed that for each ketone and each hydrocarbon, there is an optimum ratio between the ketone and hydrocarbon at which an organosol of minimum viscosity will be found. This optimum ratio is usually very critical in that slight deviations from it will cause an undue increase in the consistency of the organosol. Also, present organosols tend to thicken unduly on aging.

We have found that dispersions of vinyl chloride resins in organic liquids composed in whole or in part of 2,6,8-trimethyl-4-nonanone (B. P. 90–92° C. at 10 mm.), which may be formed by the reduction of the corresponding unsaturated ketone, Compt. rend. 149, 423, Bull. Soc. Chem. 4, 49, 426–41 (1931), 5, 257–63 (1935), have distinctive properties. This ketone has a weak solvent action on the vinyl chloride resins in that it exhibits little tendency to dissolve the resins or to swell them extensively. At the same time it has a strong dispersant action on these resins to form organosols which are free from agglomeration and flocculation. In many respects, 2,6,8-trimethyl-4-nonanone, exhibits by itself the same dispersant qualities as shown by a balanced blend of a lower ketone and a hydrocarbon diluent. When this higher ketone is blended with hydrocarbons of either the aromatic or aliphatic series, and the blends used to disperse vinyl chloride resins, there is a ratio of ketone to hydrocarbon at which organosols of minimum viscosity are formed. However, as shown in the attached drawings, the organosols do not increase sharply in consistency as the dispersant blend departs in composition from the optimum point, particularly where the deviation is toward blends which are richer in ketone. Also, for a given total solids content, a dispersion of a vinyl chloride resin in a balanced thinner of 2,6,8-trimethyl-4-nonanone and a hydrocarbon will have a lower viscosity than a dispersion of the same resin in diisobutyl ketone, which is one of the best dispersants presently known, blended with an optimum amount of the same hydrocarbon for minimum viscosity. Moreover, organosols containing the higher ketone do not increase in viscosity on aging as much as do organosols containing diisobutyl ketone. Furthermore, fluid dispersions of vinyl chloride resins in thinners containing 2,6,8-trimethyl-4-nonanone may be formulated at higher total solids content than is possible using other dispersants.

The effect of different diluents and plasticizers on the viscosity of organosols containing 2,6,8-trimethyl-4-nonanone is shown in the attached drawings. In each instance, the dispersed resin was a coagulated emulsion-polymerized vinyl chloride-vinyl acetate copolymer containing 96 to 98% vinyl chloride and having a specific viscosity in nitrobenzene of about 0.26 to 0.31. The percentages given are by weight.

In Figure 1, the organosol contains a plasticizer and the diluent is a mixture of equal parts of xylene and an aliphatic hydrocarbon ("Apco-thinner") having a boiling point range of 115° C. to 142° C. An organosol having the lowest viscosity is obtained when the thinner contains about 60% of the trimethyl nonanone, although this point is not as critical as in comparative organosols containing diisobutyl ketone.

Figure 2:
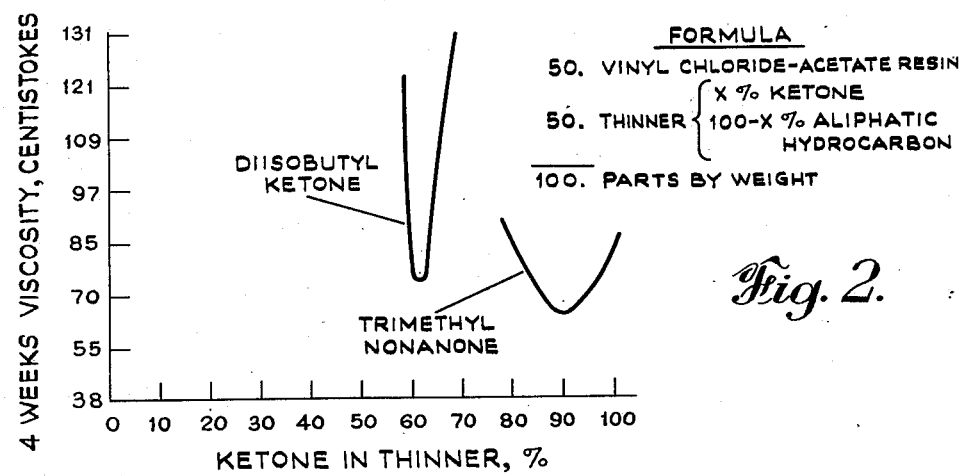

In Figure 2, the organosols contain no plasticizer and have a higher resin content than the organosols of Figure 1, and diluent is wholly an aliphatic hydrocarbon having a boiling point range of 115° to 142° C. The viscosities plotted are those measured after four weeks aging. Under these conditions, an organosol having the lowest viscosity is obtained when the thinner contains 90% of the trimethyl nonanone, but thinners composed wholly of this ketone also give fluid dispersions.

Figure 3:
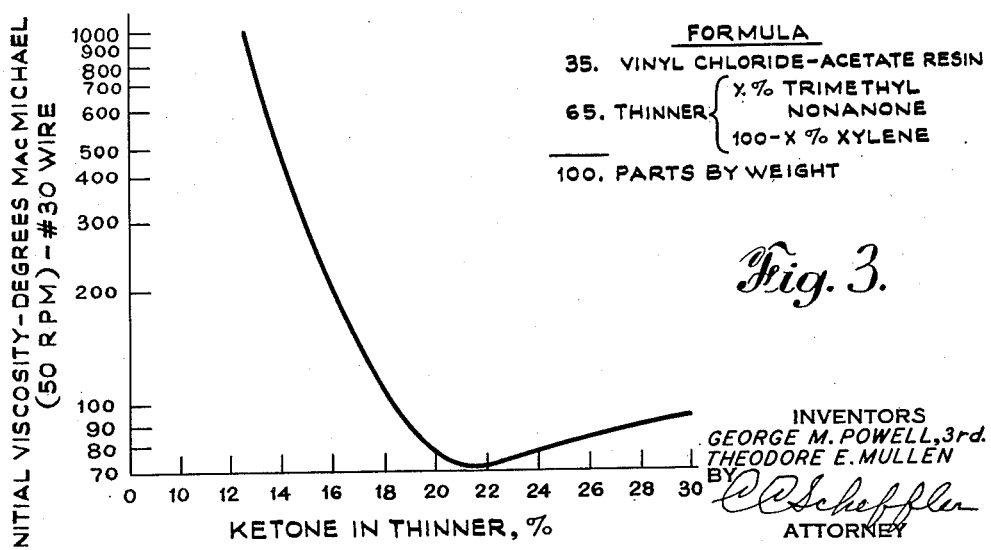

In Figure 3, the effect of diluting the trimethyl nonanone with an aromatic hydrocarbon, i. e. xylene, on the viscosity of the organosol is represented. In this instance, the minimum viscosity is obtained at much lower concentration of trimethyl nonanone of about 21%, although, as in Figures 1 and 2, the viscosity does not increase sharply with increasing concentration of trimethyl nonanone.

Thus, it is apparent that the thinner used for making the improved organosols may be exclusively 2,6,8-trimethyl-4-nonanone, mixtures of this ketone with liquid aliphatic hydrocarbons, such as pentane, hexane, heptane, octane, cyclohexane and ethylcyclohexane; mixtures of this ketone with liquid aromatic hydrocarbons, such as benzene, toluene and xylene; or mixtures of this ketone with blends of aliphatic and aromatic hydrocarbons. When the diluent is an aliphatic hydrocarbon, the thinner may contain from 60 to 99% of the ketone; and when the diluent is an aromatic hydrocarbon, the thinner may contain from 10 to 40% of the ketone. When the diluent is a mixture of about equal parts of aromatic hydrocarbons with aliphatic hydrocarbons, the thinner may contain from 40 to 80% of the ketone. A mixture of 2,6,8-trimethyl-4-nonanone and other ketones blended with hydrocarbon diluents may also be used by adjusting the diluent concentration to compensate for differences in the dispersant power of the individual ketones in such ketone mixture.

The vinyl chloride resin content of the organosol may be between 25 and 65% by weight of the organosol. Plasticizers, pigments and stabilizers of the type usually employed in vinyl chloride resin coatings may also be added to the organosols.

The organosols are formed by grinding the ingredients, the methods used being described in our previous U. S. Patent No. 2,431,078. Coatings and films are formed from the organosols by baking methods similar to those already described in our previous patent, a distinction being however that films laid down from organosols containing trimethyl nonanone must be baked at higher temperatures or for longer times to remove the ketone which boils at about 218–222° C. at 760 mm. Tests have shown that there is practically no residual solvent after baking for 10 minutes at 350° F. a 6 mil film deposited from a dispersion of vinyl chloride resin in this ketone. The fact that the ketone is retained in the film for a period after the baking operation starts is actually advantageous as the ketone aids in the fusion of the resin particles to form a strong and coherent film.

The trimethyl nonanone of this invention is also of assistance in formulating plastisols from vinyl chloride resins. On heating a plastisol, which is a dispersion of a vinyl chloride resin in a liquid plasticizer, the resin particles absorb the plasticizer and the mixture fuses into a homogeneous elastomeric composition. However, the proportion of plasticizer required to make fluid plastisols is frequently such that the fused film is more soft and tacky than desired. In an attempt to reduce the amount of plasticizer in the fused elastomer, volatile liquids have been substituted for part of the liquid plasticizer required for fluidity of the plastisol. However, these attempts have been unsuccessful because most of the volatile liquids tried actually increased the viscosity of the plastisol, especially on aging, and often they caused blistering and reduced the strength of fused films deposited from the diluted plastisol. It has been found that trimethyl nonanone is not subject to these disadvantages, and plastisols may be formulated using the proper amount of plasticizer required to give the desired hardness in the final film, and the consistency of the plastisol adjusted for the desired fluidity by including trimethyl nonanone in the plastisol. Upon baking the plastisol at 300 to 350° F., the trimethyl nonanone is volatilized, leaving a coherent film containing the desired amount of plasticizer. As a general rule, a plastisol contains from 40 to 60% by weight of a non-volatile liquid plasticizer, such as di(2-ethylhexyl) phthalate, dioctyl sebacate or tricresyl phosphate, and the thinned plastisols of this invention may contain 100 parts of a vinyl chloride resin, from 40 to 120–150 parts of a liquid plasticizer and from 10 to 50 parts of the trimethyl nonanone.

The vinyl chloride resins which may be used in the practice of this invention are emulsion-polymerized polymers and copolymers of vinyl chloride containing from 80 to 100% combined vinyl chloride and having an intrinsic viscosity above 0.8. In the case of the copolymers, the other monomer may be any of the ethylenic unsaturated polymerizable compounds, such as vinyl acetate, vinyl propionate, diethyl maleate, fumarate, methyl acrylate, ethyl acrylate, vinylidene chloride, vinyl fluoride and the like. The amount of such monomer combined in the polymer may be as little as 1% or as much as 20%.

The following examples will serve to illustrate the invention:

*Example 1*

The following dispersions were prepared by charging the thinner and three-fourths of the resin to an attrition type mill and then adding the remainder of the resin as the grinding progressed:

| | A | B |
|---|---|---|
| | Per cent | Per cent |
| Vinyl chloride-acetate copolymer 96-97% vinyl chloride, int. visc. 1.3 to 1.7 | 60.0 | 65.0 |
| 2,6,8-trimethyl-4-nonanone | 28.0 | 25.0 |
| "Apcothinner" (Aliphatic diluent B. P. 115°–142° C.) | 12.0 | 10.0 |
| | 100.0 | 100.0 |

Both dispersions were more fluid than a typical plastisol. Smooth, clear films were obtained from both dispersions by baking at 250° F., although, at this temperature some of the ketone was retained in the film. A dispersion of a pigment in a plasticizer was added to composition A to form a thick, smooth paste suitable as a letter-press ink.

*Example 2*

The following pigmented dispersion was prepared by grinding for three passes on a three roll mill:

Per cent by weight
Resin (as in Example 1) ------------------ 47.5
Titanium dioxide ------------------------ 6.4
White lead ------------------------------ 6.4
Di(2-ethylhexyl) phthalate --------------- 19.1
2,6,8-trimethyl-4-nonanone -------------- 20.6
                                          ------
                                          100.0

The dispersion was a thick, flowable liquid suitable for silk-screening. The deposited material may be fused by infra-red lamps.

*Example 3*

The following dispersion was prepared by grinding:

Per cent by weight
Resin (as in Example 1) ------------------ 50
Di(2-ethylhexyl) phthalate --------------- 50
                                          ----
                                          100

On hundred (100) parts of this dispersion was thinned with 10 parts of each of the following liquids: "Apcothinner," xylene, high flash point naphtha, ethoxyethanol, diisobutyl ketone, butyl acetate, toluene, butanol, and 2,6,8-trimethyl-4- nonanone. Each of the thinned plastisols, after aging for three days, was cast on aluminum foil at a 30 mil setting of the casting knife, air-dried for one minute, and then baked for two minutes at 350° F. Only the film containing the trimethyl nonanone was free of blisters after this treatment.

*Example 4*

The following dispersions in parts by weight were prepared by grinding on a three-roll mill for three passes, and, after aging for seven days, their consistency on stirring was compared on an arbitrary scale where 10 represents water fluid, 5 represents barely pourable and 4 represents non-pourable:

|  | A | B | C | D |
|---|---|---|---|---|
| Vinyl resin (as in Example 1) | 10 | 10 | 10 | 10 |
| Di(2-ethylhexyl) phthalate | 9 |  |  |  |
| Dioctyl sebacate |  | 9 | 6 | 6 |
| Methoxyethyl ester of acetylated polymerized ricinoleic acid |  |  | 3 |  |
| 2,6,8-trimethyl-4-nonanone |  |  |  | 3 |
| Consistency | 5 | 7 | 7 | 8 |

These results show that part of the permanent plasticizer in a plastisol may be replaced with trimethyl nonanone to form a more fluid dispersion which however, on fusing, will set up to a harder elastomer.

*Example 5*

Liquid resinous polyesters are valuable plasticizers for vinyl chloride resins because of their low volatility, but in general they are too viscous to serve as the sole dispersant in plastisols. To demonstrate the value of trimethyl nonanone as a thinner for resinous plasticizers, the following dispersions were prepared by grinding the ingredients in parts by weight on a three-roll mill:

|  | A | B | C |
|---|---|---|---|
| Vinyl chloride resin (as in Example 1) | 100 | 100 | 100 |
| Acetylated polyester of succinic acid and 2-ethylhexanediol-1,3 | 50 | 75 | 50 |
| Di(2-ethylhexyl) phthalate | 25 |  | 50 |
| 2,6,8-trimethyl-4-nonanone | 25 | 25 |  |
|  | 200 | 200 | 200 |
| Viscosity-Cps. as detn. with Brookfield Viscosimeter, 6 R. P. M.: |  |  |  |
| Initial | 4,350 | 9,850 | 34,500 |
| Aged 1 day | 5,000 | 10,600 | 38,500 |
| Aged 7-10 days | 5,000 | 7,000 | 34,000 |

These data indicate trimethyl nonanone is an effective thinner for reducing the viscosity of plastisols containing resinous plasticizers as part or all of the dispersant.

What is claimed is:

1. A fluid suspension containing between 25 and 65% by weight of solid particles of an emulsion-polymerized vinyl chloride resin containing from 80 to 100% combined vinyl chloride, said resin particles being suspended in an organic liquid containing 2,6,8-trimethyl-4-nonanone as a dispersant.

2. A fluid suspension containing between 25 and 65% by weight of solid particles of an emulsion-polymerized vinyl chloride resin containing from 80 to 100% combined vinyl chloride, said resin particles being suspended in a thinner composed of from 10 to 40% by weight of 2,6,8-trimethyl-4-nonanone and from 60 to 90% by weight of an aromatic hydrocarbon.

3. A fluid suspension containing between 25 and 65% by weight of solid particles of an emulsion-polymerized vinyl chloride resin containing from 80 to 100% combined vinyl chloride, said resin particles being suspended in a thinner composed of from 60 to 99% by weight of 2,6,8-trimethyl-4-nonanone and from 1 to 40% by weight of an aliphatic hydrocarbon.

4. A fluid suspension containing between 25 and 65% by weight of solid particles of an emulsion-polymerized vinyl chloride resin containing from 80 to 100% combined vinyl chloride, said resin particles being suspended in a thinner composed of from 40 to 80% by weight of 2,6,8-trimethyl-4-nonanone and 20 to 60% by weight of a mixture of about equal parts by weight of aromatic and aliphatic hydrocarbons.

5. A fluid suspension containing between 25 and 65% by weight of solid particles of an emulsion-polymerized vinyl chloride resin containing from 80 to 100% combined vinyl chloride, said resin particles being suspended in a mixture of a liquid plasticizer for the resin and 2,6,8-trimethyl-4-nonanone.

6. A fluid suspension containing about 35% by weight of solid particles of an emulsion polymerized vinyl chloride-vinyl acetate copolymer containing 96 to 98% copolymerized vinyl chloride, said copolymer particles being suspended in a thinner composed of from 20 to 30% by weight of 2,6,8-trimethyl-4-nonanone and from 70 to 80% by weight of xylene.

GEORGE M. POWELL, 3RD
THEODORE E. MULLEN.

REFERENCES CITED

The following references are of record in the file of this patent:

UNITED STATES PATENTS

| Number | Name | Date |
|---|---|---|
| 2,292,734 | Bent et al. | Aug. 11, 1942 |